A. C. KETCHAM.
CAR TRUCK WITH ADJUSTABLE AXLE.

No. 10,861.  Patented May 2, 1854.

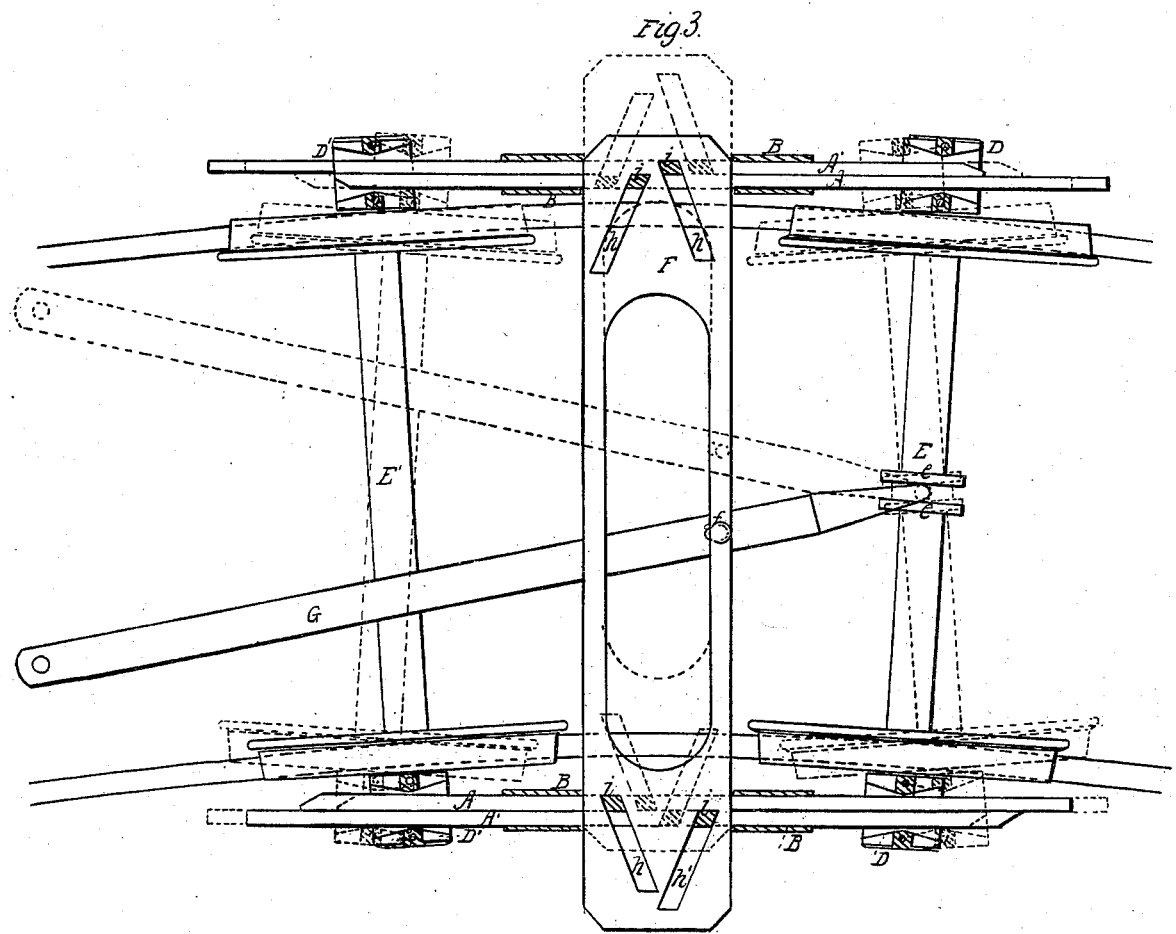

UNITED STATES PATENT OFFICE.

A. C. KETCHUM, OF NEW YORK, N. Y.

CAR-TRUCK WITH ADJUSTABLE AXLE.

Specification of Letters Patent No. 10,861, dated May 2, 1854.

*To all whom it may concern:*

Be it known that I, ARCHIBALD C. KETCHUM, of the city, county, and State of New York, have invented a new and useful Improvement in Running-Gears of Railroad-Cars and All Carriages Used on Railroads; and I do hereby declare that the following is a full, clear, and exact description of the same, reference being had to the accompanying drawings, forming part of this specification, in which—

Figure 1:
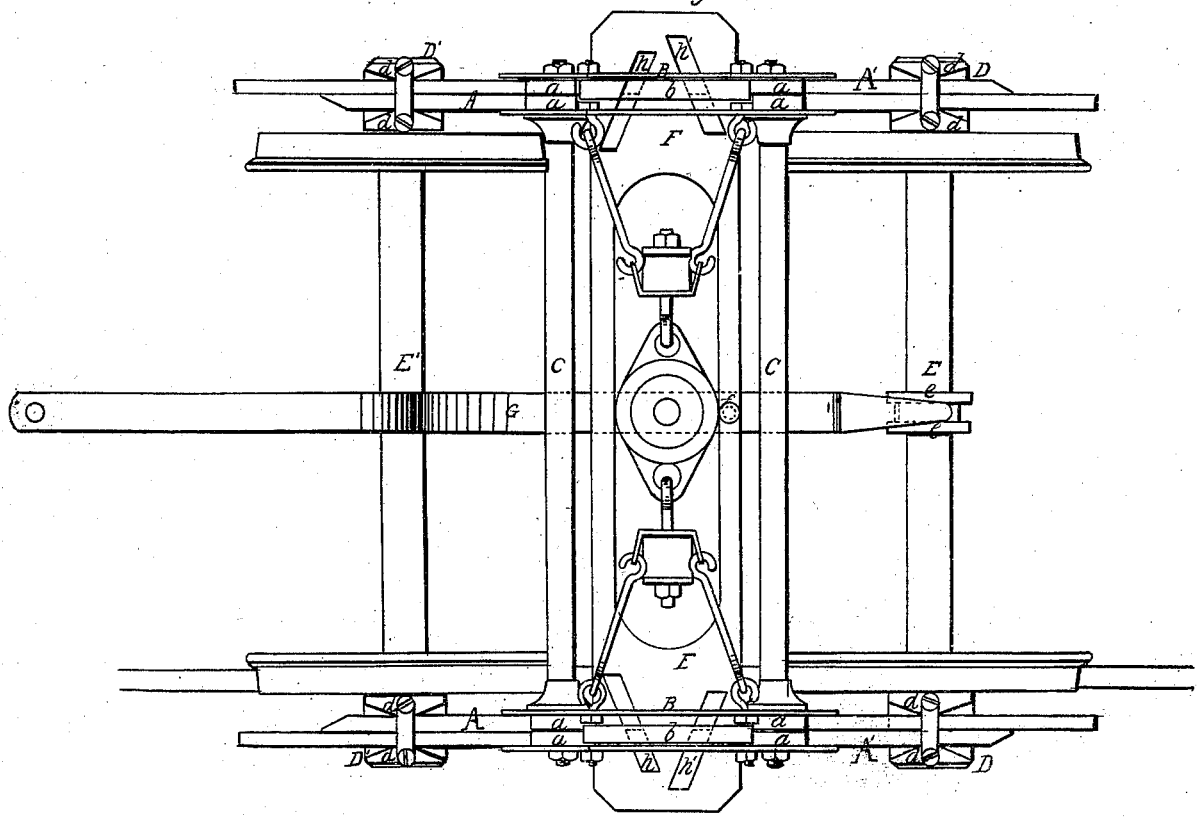
Figure 2:
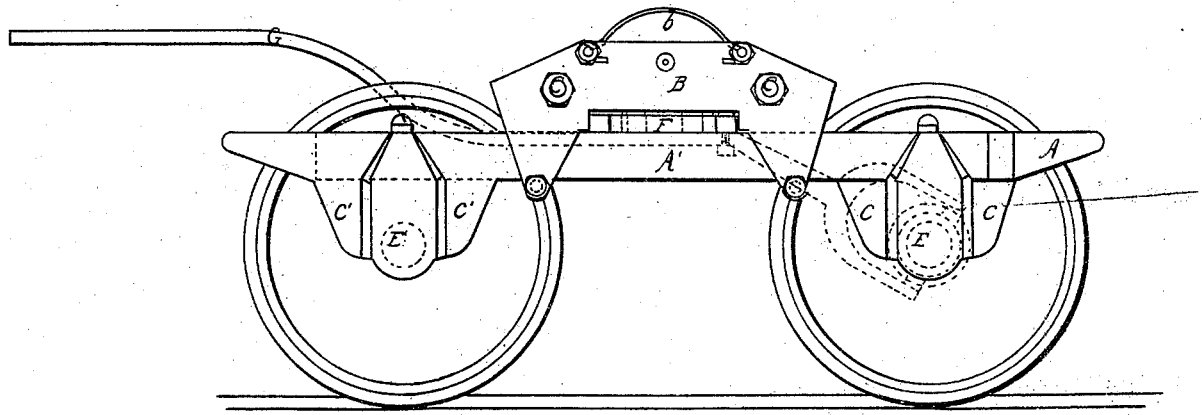

Figure 1, is a plan of a railroad truck, constructed according to my invention. Fig. 2, is a side elevation of the same. Fig. 3, is a plan of those parts of the same to which the invention more particularly relates, showing the said parts in two positions, by different colored lines.

Similar letters of reference indicate corresponding parts, in each of the several figures.

This invention is intended to prevent the liability of cars to run off the track in turning curves, by making all the wheels of the truck follow exactly in the line of the curve.

It consists in making each side of the truck in two parts, connected in such a way as to admit of their sliding longitudinally in relation to each other; the bearing of one of the two axles being in one of the said parts, and the bearing of the other axle in the other of the said parts of the side; and in connecting the two parts of each of the two sides with a transverse sliding bar, which is connected with a lever, of the second order, having its fulcrum on the axle farthest from the end of the car; the opposite end of the lever being attached to the end of the car. The transverse sliding bar is furnished with slots, which receive studs on the sliding parts of the sides of the truck; these slots are of such a shape, that when the bar is moved by the action of the lever, in turning curves, they cause the sliding sides to move and bring the axles in the position of radii, or normals, to the curve.

To enable those skilled in the art to make and use my invention, I will proceed to describe its construction and operation.

The two parts, A, A', of each side of the truck, are made of very strong iron plate, and are held together by two boxes, B, B, which, with two transverse stretchers, C, C, form a strong frame; the said frame resting upon rollers, a, a, which run on the upper edges of the plates; the said rollers being in the boxes, B, B, and their axles being formed by part of the stretchers, C, C. The boxes, B, B, carry the springs, b, b, on which the car rests. The plates, A, A, are furnished with guides, c, c, to receive the axle boxes, D, D, of the axle, E, which is the farthest axle under the car; and the plates, A', A', are provided with guides, c', c', to receive the boxes, D', D', of the axle, E', which is the axle nearest the end of the car. Each plate rests on a box of both axles, although the boxes are fitted to guides in one plate only. The boxes are fitted to their guides in such a way as to allow of a little vibration, but are kept in place laterally by pieces, d, d, projecting upward from them, inside the plates, A, A, and outside the plates, A', A'.

F, is the transverse sliding bar; and G, is the lever by which it is operated upon. The sliding bar is fitted to slide laterally in the boxes, B, B, resting upon the plates, A, A, A', A'. The fulcrum of the lever, G, is at the center of the length of the axle, E; the lever being formed with a fork, carrying two studs, which work in a recess between two bands, e, e, surrounding the axle. The lever is connected at, f, with the sliding bar, F, by a pin; and it should be connected at, g, with the end, or with some portion of the bottom of the car, in the central line. The slots, h, h, h', h', by which the sliding bar is connected with the sliding side pieces, A, A, A', A', run in an oblique direction; and there is one to receive every one of the projecting pieces, i, i, i, i, which stand up, one from each side piece.

In running on a straight track, the lever, G, and sliding bar, F, occupy a central position, and the axles are parallel; but, in turning curves, the end, g, of the lever, is drawn by the car toward the outside of the track and shifts the transverse sliding bar in the same direction. The motion of the transverse bar causes the slots, h, h, h', h', to act on the projecting pieces, i, i, i, i, and move the sliding side pieces, A, A', on the inner track, in such a manner as to make their journal-boxes approach each other; while, at the same time, they move the side pieces on the outside of the track in such a manner as to increase the distance between the journal-boxes, as shown by the black lines in Fig. 3. If the slots, h, h, h', h', are properly placed, the motion of the boxes will be such as would make both axles form radii to the curve, if the curve is a part of a circle; or normals, to any other curve, and thus the wheels would stand as nearly as possible in the line of the track. The same effect will be produced both at the forward and back ends of the car.

The position of the slots will be found by any person expert in mechanical movements; if set out for a curve of any given radius, they will serve for all others.

What I claim as my invention, and desire to secure by Letters Patent, is,

The combination of the sliding side pieces, A, A, A', A', the transverse sliding bar, F, and the lever, G, in the manner substantially as described, for the purpose of causing the axle boxes to move in such a way as to make the axles assume the form of radii, or normal, to the curve, and thereby keep the wheels in line with the track.

A. C. KETCHUM.

Witnesses:
S. H. WALLS,
E. C. POLHAMUS.